Aug. 13, 1929.   D. M. HARRINGTON   1,724,020
LOW PRESSURE ALARM FOR TIRES
Filed Jan. 14, 1929

Inventor
Daniel M. Harrington.

By A. J. O'Brien
Attorney

Patented Aug. 13, 1929.

1,724,020

UNITED STATES PATENT OFFICE.

DANIEL M. HARRINGTON, OF DENVER, COLORADO.

LOW-PRESSURE ALARM FOR TIRES.

Application filed January 14, 1929. Serial No. 332,247.

This invention relates to improvements in signals for sounding an alarm when the pressure within an automobile tire falls below a predetermined value.

Pneumatic tires are almost universally employed in connection with automobiles and these, of course, require that the pressure within the tire be maintained at a predetermined value. If there is a slow leak which permits the pressure to gradually decrease, the tire will be subjected to excessively large flexure due to the fact that the pressure is not sufficient to sustain the load, and this constant bending of the tire casing as the wheel travels very quickly destroys the casing by weakening the reenforcing fibers to such an extent that blowouts soon occur. A slow leak is, as a rule, very difficult to detect as the change in pressure is so gradual that it is not noticed by the driver, and this condition is therefore not likely to be discovered until the pressure has become so low that the casing will bump on the inner end of the valve stem during each revolution of the wheel.

It is the object of this invention to produce a simple and substantial device that can be readily applied to an automobile wheel and which shall be so constructed that a signal will be sounded when the pressure has been decreased to a certain amount and before any damage has resulted to the tire.

This invention, briefly described, consists in a plunger having an enlarged head. The enlarged head lies between the outside of the inner tube and the rim on which the casing is supported and projects through a hole in the felloe of the automobile wheel. A spring is connected with the plunger and exerts a force tending to move the enlarged head inwardly towards the center of the inner tube against the force exerted by the air pressure. When this plunger moves in either direction, it sounds an alarm which in the embodiment to be hereinafter described, consists of a bell. When the driver of the car hears the sound of this bell he knows that the pressure is low and therefore has an opportunity to correct this condition before serious damage has been done.

Figure 1:
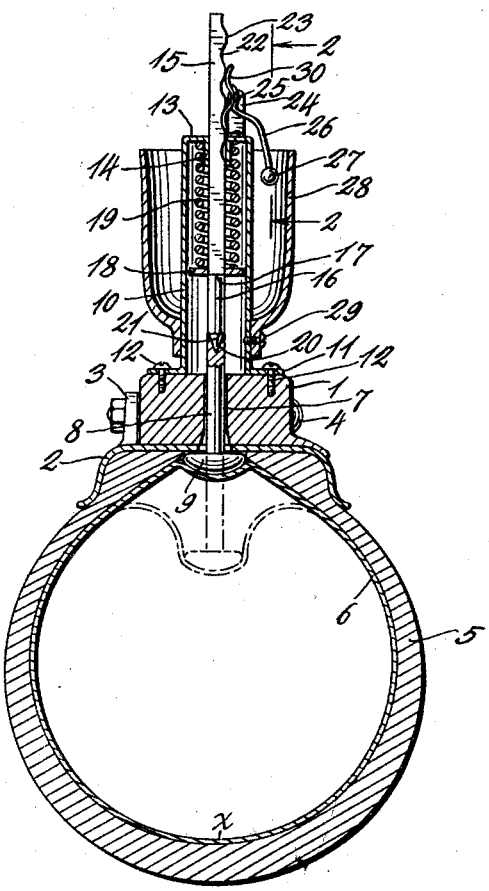
Figure 2:
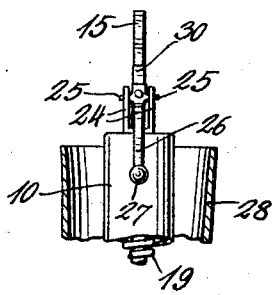

Having thus briefly described the invention, the same will now be described in detail, and reference for this purpose will be had to the accompanying drawing in which one embodiment of this invention has been illustrated and in which:

Fig. 1 is a section taken through an automobile tire and through the felloe of the wheel on which it is supported; and Fig. 2 is a fragmentary view taken on line 2—2, Fig. 1.

In the drawing numeral 1 represents the felloe of an automobile wheel and 2 the demountable rim which is provided with a plurality of lugs 3 through which the securing bolts 4 extend and by means of which it is held in place on the felloe. Secured to the demountable rim is a tire casing 5 within which is located an inner tube 6. The felloe is provided with an opening 7 through which the stem 8 of the plunger extends. The enlarged head 9 is located between the outer surface of rim 2 and the inner tube in the manner shown in Fig. 1. The pressure of the air in the inner tube tends to move the plunger outwardly so as to maintain the head in the position shown. A hollow cylindrical member 10 has its open end provided with an outwardly extending flange 11 that is perforated for the reception of screws 12 by means of which it is secured to the felloe. The other end of this tubular member is closed as indicated at 13 and is provided with an inwardly extending tubular member 14 that serves as a guide for the plunger 15. The opening in member 14 is preferably square or noncircular and plunger 15 has a correspondingly shaped cross section so that it is held against rotation. The inner end of plunger 15 which has been designated by reference numeral 16 is preferably circular in cross section and therefore a shoulder 17 is provided between this circular section and the noncircular section of plunger 15. A washer 18 is supported on shoulder 17 and serves as an abutment for the spring 19 which extends between the end 13 and the washer 18. This spring is under compression and therefore tends to move plunger 15 outwardly forwards the felloe. The inner end of plunger 8 has a conical opening which has been indicated by reference numeral 20, while the outer end of the cylindrical portion 16 terminates in a conical point 21 that is adapted to project into the opening 20. Spring 19 is held under compression by the air pressure in the inner tube 6 and its strength is selected of such value that when the pressure in the tire is of the proper value the pressure exerted by the spring and by the air pressure will be substantially equal so that the plunger head 9 will float and therefore as soon as the pressure of the air decreases the spring will move the plunger 9 inwardly towards the dotted line position shown in the drawing. One edge of plunger 15 is provided with a plurality of shallow notches 22, which are connected by curved projections 23 so as to produce a wavy surface. Secured to the end 13 is a bracket having two arms 24 which are perforated for the reception of the pivot 25 of the bell clapper 26. The clapper arm 26 is provided with an enlarged end 27 which is adapted to strike the inner surface of the bell 28 that is secured to the cylindrical member by means of screws 29. A spring 30 is secured to the clapper arm 26 and is bow-shaped and of such length that when one end of this spring is in a depression 22, the other end will be resting on a projection 23. When plunger 15 is reciprocated, it will oscillate the clapper arm 26, thereby causing the bell clapper 27 to strike the bell and produce an audible signal. After the pressure in the inner tube has decreased to some extent, so as to allow the plunger head 9 to approach the dotted line position shown in Fig. 1, any sudden increase in pressure due to the automobile wheel passing over the projection in the road, or falling down into a depression, will cause the plunger to be suddenly moved outwardly so as to ring the bell. If the leakage is not discovered until the pressure is very low, the casing will be deformed to such an extent that the inner surface of the inner tube 6 which lies directly opposite from head 9 and which has been designated by X, will be moved towards the head of the plunger and the weight of the car will therefore move the plunger inwardly during each revolution of the wheel thereby violently agitating the bell clapper. As the wheel rotates the spring will move the plunger outwardly and thus again sound the alarm so that with very low pressures two distinct alarms will be sounded every revolution of the wheel. It is not necessary, however, for the pressure to become so low that the casing will be entirely collapsed before the alarm is sounded, because, as above explained, as soon as the pressure has decreased sufficiently to permit the plunger head to move away from the outer surface of the demountable rim, the variations in pressure which invariably occur within the tire as the wheels pass over the inequalities in the road surface will be sufficient to operate the signal, and therefore the low pressure in the tire will be discovered before it has decreased to such an extent as to cause any damage to the parts.

From the above description it will be apparent that I have produced a very simple signal device that can be applied to any automobile wheel of general construction and which will sound an alarm whenever the pressure within the tire has decreased to a predetermined amount.

Having described the invention what is claimed as new is:

In a device of the class described, in combination a wheel having a felloe, a tire casing, means for securing the casing to the felloe, a flexible air tight tube located within the casing, a plunger formed from a plurality of parts and having one end provided with an enlarged head, the head being located between the felloe and the outer surface of the inner tube, resilient means associated with the outer portion of the plunger for exerting a force thereon tending to move the plunger inwardly towards the center of the inner tube, an audible signal, and means for operating the signal when the plunger reciprocates.

In testimony whereof I affix my signature.

DANIEL M. HARRINGTON.